UNITED STATES PATENT OFFICE.

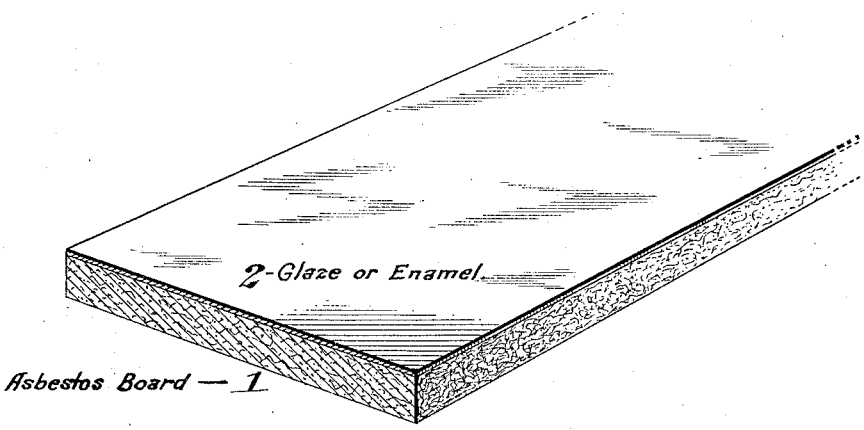

JOHN FERLÀ, OF NEW YORK, N. Y., ASSIGNOR TO AMERICAN MINERAL WOOD MANUFACTURING COMPANY, A CORPORATION OF NEW YORK.

TILE.

1,047,927. Specification of Letters Patent. Patented Dec. 24, 1912.

Application filed May 25, 1907. Serial No. 375,744.

*To all whom it may concern:*

Be it known that I, JOHN FERLÀ, a citizen of the Republic of Switzerland, residing in New York city, New York, have invented a new and useful Improvement in Tiles, of which the following is a specification.

This invention relates to tiles and has for its object the production of a tile possessing in similar degree the capacity for resisting heat and chemical action which characterizes an ordinary ceramic tile and also characterized by greater strength, lighter weight, and a capacity to withstand shocks and jars which would shatter the ordinary ceramic tile.

The invention also contemplates the production of a tile especially adapted for wainscoting and roofing which can be nailed in place like a shingle and which will not be split by driving nails through it.

My improved tile is illustrated in the accompanying drawing, and consists essentially of a body of asbestos board and an outer covering of as many surfaces as desired of enamel or glaze. The asbestos board which forms the body of the tile may be produced in various ways, but I preferably employ an asbestos board composed of asbestos, Portland cement, hemp, acetic acid and glue united in suitable proportions. This composition, when formed in sheets and subjected to heavy pressure, is characterized by a greater degree of toughness than any other asbestos board of which I am aware which may be worked with wood-working tools and it is therefore specially well adapted to receive a coating of enamel or glaze.

In the drawings 1 designates the asbestos board body of the tile and 2 designates the coating of glaze or enamel, which is shown as extending over one surface only. It is to be understood, however, that the glaze may be applied over all the surfaces of the tile if desired. The application of the enamel or glaze to the body of the tile may be effected by any of the ordinary methods, as the body of the tile is adapted to withstand the heat required to melt any of the ordinary glazing or enameling compounds without being injured thereby.

Having thus described my invention, what I claim as new and desire to secure by Letters Patent is:

1. As an article of manufacture, a tile comprising a body portion of compressed asbestos hardened and made homogeneous by a binder that is infusible at the melting temperature of enamel, and provided with a surface coating of encaustic enamel fused thereon.

2. As an article of manufacture, a tile comprising a body portion consisting of asbestos, Portland cement, hemp, acetic acid and a suitable adhesive, and provided with a surface coating of encaustic enamel or glaze fused thereon.

3. A composition of matter comprising compressed homogeneous asbestos and including a binder infusible at the melting point of encaustic enamel, and a surface coating of encaustic enamel fused thereon.

4. A composition of matter comprising a homogeneous compressed mixture of asbestos, Portland cement, hemp, acetic acid and a suitable adhesive, so as to be infusible at the melting temperature of an encaustic enamel.

In testimony whereof, I have signed my name in the presence of two witnesses.

JOHN FERLÀ.

Witnesses:
J. FRANK GUIMARAÈ,
W. BRADFORD.